United States Patent
Keiser et al.

(10) Patent No.: US 10,198,586 B1
(45) Date of Patent: Feb. 5, 2019

(54) PROVISIONING OF DIGITAL MEDIA FILES TO RESIDENT MEDIA DEVICES IN CONTROLLED-ENVIRONMENT FACILITIES

(71) Applicant: Securus Technologies, Inc., Dallas, TX (US)

(72) Inventors: Luke Keiser, Frisco, TX (US); Scott Passe, Forney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 14/489,345

(22) Filed: Sep. 17, 2014

(51) Int. Cl.
| G06F 21/62 | (2013.01) |
| G06F 21/60 | (2013.01) |
| H04L 29/06 | (2006.01) |
| H04L 29/08 | (2006.01) |

(52) U.S. Cl.
CPC ............ *G06F 21/62* (2013.01); *G06F 21/60* (2013.01); *H04L 63/02* (2013.01); *H04L 67/12* (2013.01)

(58) Field of Classification Search
CPC ......... G06F 21/60; G06F 21/62; H04L 63/02; H04L 67/12
See application file for complete search history.

(56) References Cited

U.S. PATENT DOCUMENTS

| 2003/0126267 | A1* | 7/2003 | Gutta ............... G06F 17/30867 709/229 |
| 2004/0142744 | A1* | 7/2004 | Atkinson et al. ............... 463/29 |
| 2006/0130107 | A1* | 6/2006 | Gonder et al. ................ 725/110 |
| 2008/0096529 | A1* | 4/2008 | Zellner .......................... 455/411 |
| 2011/0183685 | A1* | 7/2011 | Burton .................. G06F 21/316 455/456.1 |
| 2012/0303827 | A1* | 11/2012 | Neystadt et al. ............. 709/229 |
| 2013/0179949 | A1* | 7/2013 | Shapiro ............................. 726/4 |
| 2013/0219507 | A1* | 8/2013 | Chang et al. .................... 726/26 |
| 2013/0315392 | A1* | 11/2013 | Steinhauser .................. 380/258 |
| 2014/0283136 | A1* | 9/2014 | Dougherty et al. ............ 726/29 |
| 2015/0120870 | A1* | 4/2015 | Schuman ............... H04L 67/06 709/217 |
| 2015/0188925 | A1* | 7/2015 | Gupta ............................ 726/26 |

* cited by examiner

*Primary Examiner* — Theodore C Parsons
(74) *Attorney, Agent, or Firm* — Fogarty LLP

(57) ABSTRACT

A controlled-environment facility local or remote content server downloads and caches a digital media file and determines whether a resident of the facility is allowed access to the digital media file. This determination may be made by the content server accessing a controlled-environment facility administration system. In response to a determination that the resident is allowed access, the digital media file is streamed and/or downloaded, from the content server, within a portion of the facility, to a controlled-environment facility resident media device adapted and/or approved for use by residents of the controlled-environment facility and disposed within the aforementioned portion of the facility. The streaming and/or downloading may be carried out, at least in part, via a wireless access point disposed within the portion of the controlled-environment facility to provide access by the resident media device disposed within the portion of the controlled-environment facility.

28 Claims, 3 Drawing Sheets

PROVISIONING OF DIGITAL MEDIA FILES TO RESIDENT MEDIA DEVICES IN CONTROLLED-ENVIRONMENT FACILITIES

FIELD OF THE INVENTION

This disclosure relates generally to providing digital media to residents of a controlled-environment facility, more particularly to providing digital media to controlled-environment resident media devices, and specifically to the caching and provision of digital media files to controlled-environment facility resident media devices.

BACKGROUND

Traditional methods for dissemination of education or entertainment media in controlled-environment facilities have included print libraries, or the like. Typically residents of controlled-environment facilities, particularly controlled-environment facilities such as correctional institutions, are not allowed access to streaming content. Similarly, unrestricted or untethered access to wireless data communication systems is not typically allowed, such as for security reasons. That is to say, typically, there are security concerns in a controlled environment facility that result in a need for tightly controlled media. Regardless, the cost of streamed or downloaded data, particularly in the form of media files, data plan limits, and/or the cost of bandwidth to download or stream such files, may be a concern. Moreover, the layout of a controlled-environment facility, such as the use or radiating pods in modern correctional facilities, and/or the structure of the facility itself, such as the use of steel and/or steel-reinforced concrete in correctional facilitates, make the propagation of a wireless signal for streaming, or even downloading, difficult and/or unpredictable.

SUMMARY

The present invention is directed to systems and methods, which provide digital media files to resident media devices in controlled-environment facilities. An example process implementation for providing digital media content, such as podcasts or the like, to residents of a controlled-environment facility includes downloading and caching content on a controlled-environment facility local or remote content server, and streaming within the controlled-environment facility, resident selected content from the controlled-environment facility local or remote content server to a controlled-environment facility resident media device disposed within the controlled-environment facility. As noted, these controlled-environment facility resident media devices may be tablet computing devices adapted and/or approved for use by residents of the controlled-environment facility and the controlled-environment facility local or remote content server may be firewalled. Streaming may be carried out, at least in part, via Wi-Fi, employing wireless access points. Each wireless access point may be disposed within a portion of the controlled-environment facility to provide access by controlled-environment facility resident media devices disposed in that portion of the controlled-environment facility to the streamed and/or downloaded content. For example, the controlled-environment facility may be a correctional facility and the portion of the correctional facility may be a cellblock, pod or common area, such as laundry room, the yard (outside), dayroom, cafeteria, exercise facility, or the like.

Prior to streaming and/or downloading, the controlled-environment facility content server may determine whether the resident is allowed access to the resident selected content and streaming of the resident selected content is (only) carried out in response to a determination that the resident is allowed access to the resident selected content. In accordance with various embodiments of the present systems and methods, this determination as to whether the resident is allowed access to selected content further comprises accessing a controlled-environment facility management and/or administration system by the controlled-environment facility content server.

Hence, an embodiment of a controlled-environment facility digital media distribution system includes a controlled-environment facility local or remote content server that stores and/or manages content from content providers. This controlled-environment facility local or remote content server may be firewalled. The content can be media such as podcasts, streaming music, content from employment sites, job search results, training media, law library content, games, communications, e-books, movies, television, or the like. A network connection links the controlled-environment facility local or remote content server to at least one content provider and connectivity from the controlled-environment facility local or remote content server extends to controlled-environment facility resident media devices.

In accordance with various embodiments of the present systems and methods a resident request for a digital media file may be transmitted to a content provider. The digital file may be downloaded and cached by a controlled-environment facility local or remote content server. The controlled-environment facility content server may determine whether the resident is allowed access to the media. As noted, this determination whether the resident is allowed access to the media may include accessing a controlled-environment facility management and/or administration system by the controlled-environment facility content server. In response to a determination by the controlled-environment facility content server that the resident is allowed access to the media, the media may be streamed and/or downloaded, within a portion of the controlled-environment facility.

In accordance with various implementations of the present systems and methods a media device adapted and/or approved for use by residents of a controlled-environment facility may receive a request from a controlled environment facility resident for a digital media file. The media device may determine whether the resident is allowed access to the digital media file and a controlled-environment facility content server may transmit the resident request for the digital media file to a content provider, such as in response to a determination that the resident may access the digital media file. The controlled-environment facility content server may download and cache the digital media file and may also determine whether the resident is allowed access to the digital media file. The digital media file may be streamed and/or downloaded, within a portion of the controlled-environment facility, in response to a determination by the controlled-environment facility content server that the resident is allowed access to the digital media file, from the controlled-environment facility content server to the media device within the portion of the controlled-environment facility. Access to the digital media file by the resident using the media device may be allowed upon application of security measures with respect to the digital media file by the media device. These security measures with respect to the digital media file applied by the media device may comprise DNS spoofing detection, DNS redirection, use of proxy servers for privacy and security; biometric validation, password validation and/or reboot elimination.

BRIEF DESCRIPTION OF THE DRAWINGS

Figure 1:
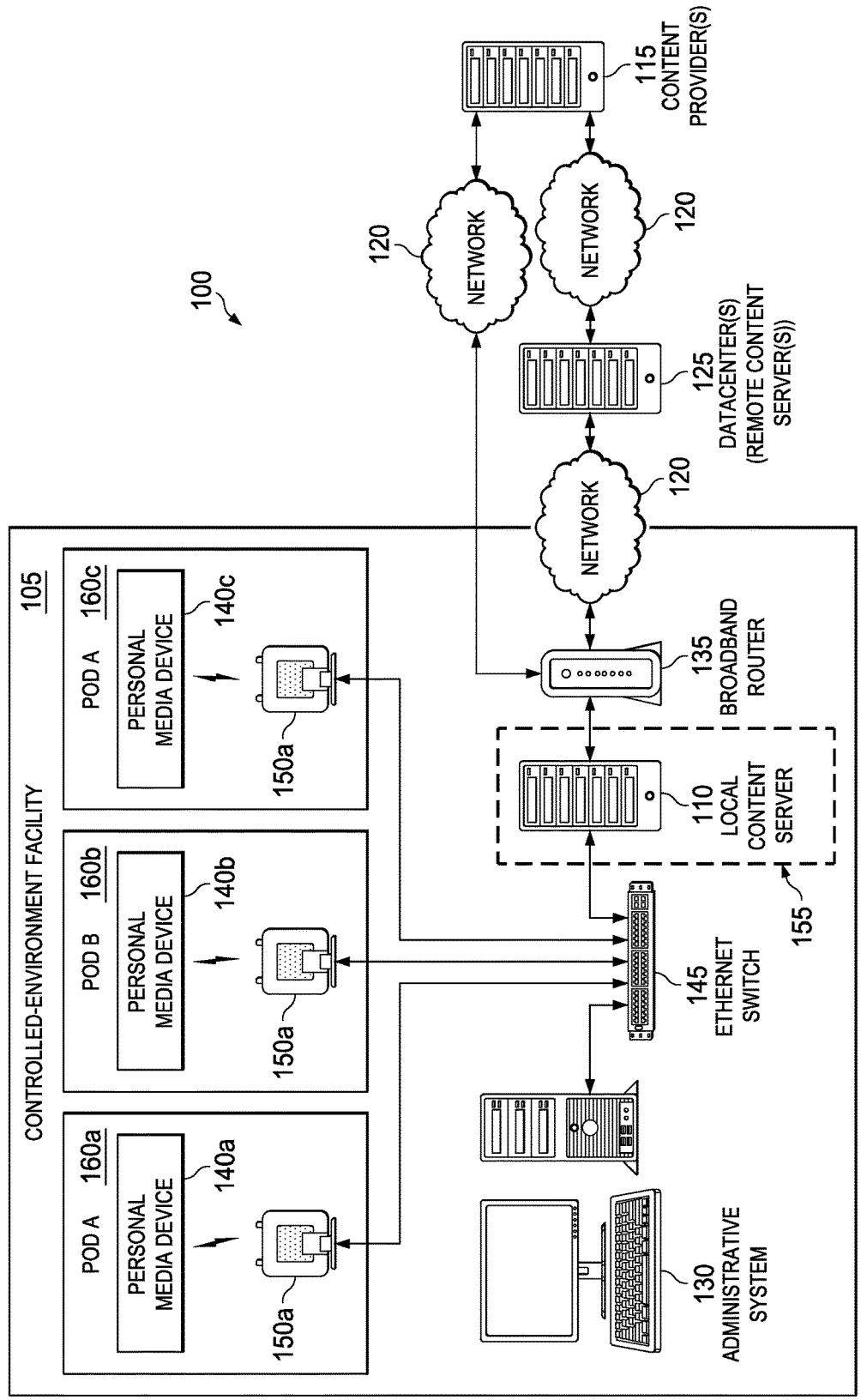
Figure 2:
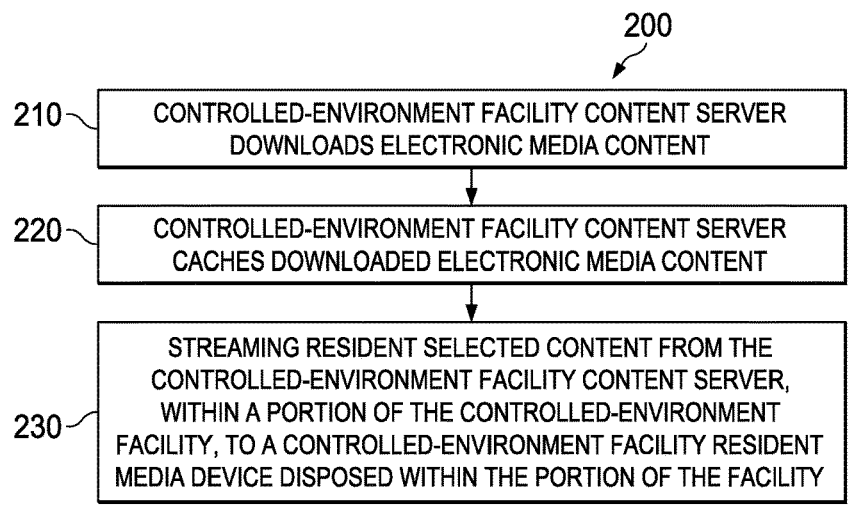
Figure 3:
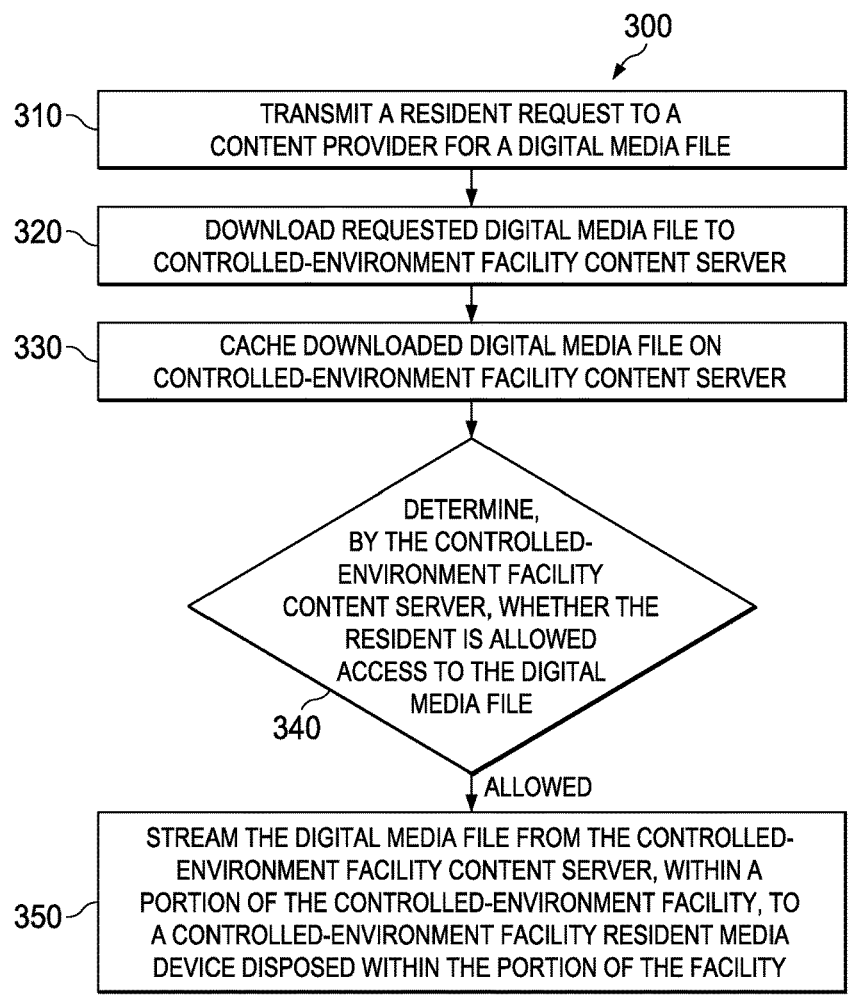
Figure 4:
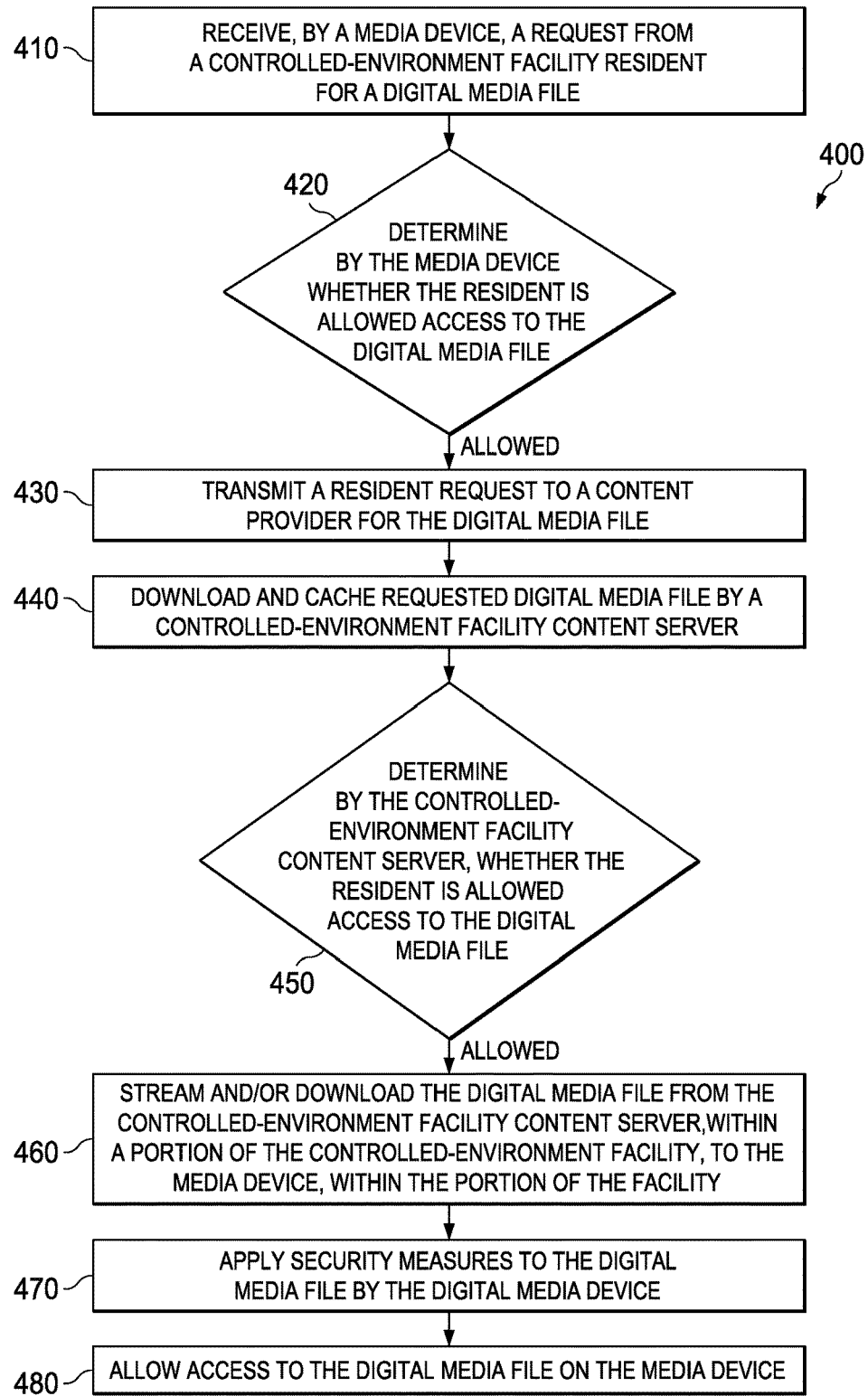

Having thus described the invention in general terms, reference will now be made to the accompanying drawings, which are not necessarily drawn to scale, and wherein:

FIG. 1 is a diagrammatic environmental illustration of an example of the present system for providing digital media files to resident media devices in controlled-environment facilities, deployed in conjunction with a controlled-environment facility, according to some embodiments;

FIG. 2 is a flowchart of an example process implementation for providing digital media files to resident media devices in controlled-environment facilities, according to some embodiments;

FIG. 3 is a flowchart of an example process implementation for providing media to resident media devices in controlled-environment facilities, according to some embodiments; and FIG. 4 is a flowchart of an example process implementation for providing digital media files to resident media devices in controlled-environment facilities using multilayered security, according to some embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the present systems and methods provide digital media to residents of a controlled-environment facility, more particularly digital media to controlled-environment resident media devices. More specifically, embodiments of the present systems and methods provide caching and provisioning of digital media files to controlled-environment facility resident media devices. For example, a controlled-environment facility local or remote content server downloads and caches a media and determines whether a resident of the facility is allowed access to the media. This determination may be made by the local or remote content server accessing a controlled-environment facility management and/or administration system. In response to a determination that the resident is allowed access, the media is streamed and/or downloaded, from the local or remote content server, within a (physical) portion of the facility, to a controlled-environment facility resident media device adapted and/or approved for use by residents of the controlled-environment facility and disposed within the aforementioned portion of the facility. The streaming and/or downloading may be carried out, at least in part, via a wireless access point disposed within the portion of the controlled-environment facility to provide access by the resident media device disposed within the portion of the controlled-environment facility. Such a physical portion of the facility may be a pod, cellblock, and/or a common area, such as laundry room, the yard (outside) dayroom cafeteria, exercise facilities or the like, of a correctional institution. Hence, embodiments of the present systems and methods may provide media, job applications, access to legal materials, and the like on resident/inmate tablet devices in a manner that can avoid traditional streaming and/or downloading (i.e. directly from a content provider) addressing issues with spotty Wi-Fi coverage in controlled-environment facilities, and the like. Also, streaming and/or downloading may be compartmentalized by leveraging the structure of the controlled-environment facility for example limiting the availability of a Wi-Fi signal providing the stream through the placement of wireless access points, antenna directionality of such wireless access points, signal strength, and/or the like. To this end, existing communication infrastructure in controlled-environment facilities, such as communications kiosks, specially adapted video phones and/or the like, may act as wireless and/or wired access points for resident/inmate tablet devices in accordance with various embodiments of the present systems and methods.

Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

FIG. 1 is a diagrammatic environmental illustration of an example of the present system 100 for providing digital media files to resident media devices in controlled-environment facilities, deployed in conjunction with controlled-environment facility 105, according to some embodiments. Illustrated embodiment of controlled-environment facility digital media distribution system 100 includes a controlled-environment facility local content server 110 that stores content from content providers 115. Content providers 115 may provide podcasts, or the like as part of a subscription, upon request, etc. Such podcasts can be serialized and/or may be audio or video, such as instructional or entertainment content. An "outward facing" network connection links controlled-environment facility local content server 110 to at least one content provider 115. Data network 120 may include one or more networks, such as the Internet, an intranet, or any other type of data network suitable for allowing transfer of digital media from content service provider 115 to local content server 110 and/or datacenter 125. Datacenter 125 may handle the request of and/or subscription to the podcasts in a manner conforming to requirements of controlled-environment facility 105 (i.e. my apply security and/or controls to the request and delivery of a media). Administrative system 130 may be a controlled-environment facility management system or functionality, such as a Jail Management System (JMS), or the like in correctional institution embodiments. Regardless, administrative system 130 may provide administration over whether a particular resident can request and/or subscribe to content at all, or content of a particular nature, and/or a particular podcast or the like. These security and/or control rules may be enforced by local content server 110 (and/or datacenter 125). Local content server 110 may pass the resident request for a particular media on through controlled-environment facility network connectivity, such as broadband router 135 either directly to the media content provider (servers) 115 or through datacenter 125, which, as illustrated, may be external to controlled-environment facility 105. Datacenter 125 may provide the content if the content is hosted in the datacenter, such as in accordance with a license or content subscription agreement. Moreover, datacenter 125 may act as or provide functionality to act as a remote content server, such as in place of, or in addition to, local content server 110, in accordance with some embodiments of the present systems and methods.

In accordance with various embodiments of the present systems and methods, administrative system 130 and controlled-environment facility local content server 110 may be located at, or in, facility 105, as illustrated in FIG. 1. However, either of controlled-environment facility local content server 110 or administrative system 130 may be combined (such as with other facility management systems), and/or located at a central location outside of the facility, disposed in a decentralized manner at several locations, or otherwise located and/or combined so as to receive or provide data communications, in accordance with the present systems and methods. As but one example, controlled-environment facility local content server 110 may be a part of, co-housed with, or co-hosted with, datacenter 125, just as to provide the aforementioned remote content server.

Inward facing connectivity from and to controlled-environment facility local content server 110 extends from and to controlled-environment facility resident media devices 140a-140c, such as via Ethernet switch 145 and wireless access points 150a-c. The controlled-environment facility resident media devices 140 may be tablet computing devices adapted and/or approved for use by residents of controlled-environment facility 105 (within controlled-environment facility 105), as discussed in greater detail below. Local content server 110, which may be referred to as a local platform, or the like, may provide content caching, such as the aforementioned storing of media, or the like. Such caching can promote balanced streaming and/or downloading of content to resident/inmate tablet devices 140a-c and/or provide for downloading, as resident/inmate tablet device access to Wi-Fi coverage allows and/or when a resident/inmate tablet device is interfaced with a communications kiosk, specially adapted video phone and/or the like.

In various embodiments, the controlled-environment facility local content server may determine whether the resident is allowed access to the content and streams the content to the resident media device in response to a determination that the resident is allowed access to the content. To this end, the controlled-environment facility local content server may access administrative system 130 to determine whether the resident is allowed access to the content. Hence, security and other controls of provisioning of the digital media to a (particular) resident can be implemented at the time of distribution of the digital media to the resident, within the controlled-environment facility. In this manner, latest restrictions, or the like, imposed on a resident can be enforced with respect to the resident. Additionally or alternatively, security and other controls of provisioning of the digital media to a (particular) resident can be implemented at the time of download and/or storage to local content server 110.

Media downloaded to local content server 110 and then distribution to residents may be licensed for such use or distribution. For example, local content server 110 may merely act as a pass-through for content licensed to a particular controlled-environment facility resident. In such embodiments or situations, the local content server may not retain a copy of the particular licensed copy of the content. In other embodiments, local content server 110 may host copies of various podcasts for distribution as appropriate under a licensing agreement, or the like.

Further, controlled-environment facility local content server 110 may be isolated by firewall 155, and/or otherwise act as a firewall, such as to afford an ability to quarantine and examine incoming digital media files, and and/or to ensure control over access to the digital media filed until the determination as to whether the intended resident recipient is allowed access to this content. For example, some downloaded content could include malware, rogue content information, or the like, which would not be approved by the content server. Access to such content may be denied, or the content may otherwise be made appropriate for downloading or steaming to the intended resident. For example, embedded inappropriate hyperlinks may be redirected via appropriate DNS redirection security measures.

As noted, communications to or from resident tablets is carried out via local network connectivity such as an Ethernet switch 145 and wireless access points 150a-150c. Communications kiosk, specially adapted videophone and/or the like, may act as wireless and/or wired access points 150a-c for resident/inmate tablet devices 140a-c. Alternatively, or additionally, access points may be dedicated wired or wireless access points, such as a Wi-Fi router or the like. Hence, the internal controlled-environment facility connectivity may include Wi-Fi connectivity, and in such embodiments a local area network employing the Wi-Fi connectivity includes wireless access points 150a-c, each disposed in corresponding portion 160a-c of the controlled-environment facility to provide access by controlled-environment facility resident media devices disposed in that portion of the controlled-environment facility. For example, where the controlled-environment facility is a correctional facility, the portion of the correctional facility may be a cellblock, pod or common area, such as laundry room, the yard (outside) dayroom cafeteria, exercise facilities or the like. So in a correctional facility embodiment, a local area network employing the Wi-Fi connectivity may employ wireless access point 150a disposed in pod 160a of correctional facility 105 to provide access by inmate media device 140a, also disposed in pod 160a. Due to the nature of the construction (e.g., steel, steel-reinforced concrete, or the like) and/or layout (e.g. radiating pod structure, or the like) of a correctional facility, coverage from a particular wireless access point (150a), should be contained to the pod (160a) in which it is installed, and hence only reach resident devices (140a) located in that pod (160a), and be more-or-less isolated from devices (140b and 140c) in other pods (160b and 160c).

Streaming and/or downloading may be further compartmentalized by taking advantage of, or employing, antenna directionality of wireless access points 150a-c, signal strength, and/or the like. For example, an authorized transceiver power level may be determined for communicating with the user interface device in response to a request. Additionally, such a system or method may dynamically set a transceiver power in response to the determination. As a further example, a secure network access point may include one or more antennas used for wirelessly communicating with a user interface device, such as the aforementioned resident tablets. The one or more antennas may be configured to communicate using a dynamically settable power level. For example, the antenna may be configured to communicate within a first range at a first power level, within a second range at a second power level, and at a third range at a third power level. In addition the antenna and/or associated RF equipment may be shut off or filtered to terminate communications between the secure network access point and the user interface device. The antenna may be an omnidirectional antenna, a directional antenna, a beam-forming antenna, etc. In some embodiments, the first communication range may be within a few feet of a secure network access point, or even a few inches, requiring the resident to go to a more-or-less or very specific location, such as a communications kiosk, resident phone, classroom, etc. to download and/or stream content. Further security measures may call for determining an authorized duration of network access for the user interface device. Additionally, the method may include establishing a temporary network access session between the user interface device and the network for the authorized duration of network access, and/or temporary access key for network access.

As noted, the controlled-environment facility resident media devices 140a-c may be tablet computing devices adapted and/or approved for use by residents of the controlled-environment facility (within the controlled-environment facility). Each tablet computing device 140 may be particularly adapted for use in a controlled-environment. For example, in a correctional institution, jail, or the like, such a tablet computing device may have a specially adapted operating system and/or may be "stripped-down," particularly from the standpoint of what applications programs (apps) and/or hardware are provided or allowed on tablet computing device 140, and/or connectivity afforded such a tablet computing device. For example, such a resident tablet computing device may employ an operating system kernel such one based upon an open source platform such as the CyanogenMod ANDROID™-based operating system, which may be rebuilt for use in such a tablet computing device in a controlled-environment facility. As a further example, the tablet computing device may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where streaming and/or downloading may be compartmentalized, leveraging the structure of the controlled-environment facility for example limiting the availability of a Wi-Fi signal providing the stream through the placement of wireless access points, antenna directionality of such wireless access points, and/or the like. Also, the resident tablet may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on resident tablets might include apps of particular interest to residents of the controlled-environment facility. For example, tablet computing devices provided to inmates of correctional facilities, might include apps that may be of particular use to an inmate, in general, such as access to a legal research service, or of more specific interest, such as providing an inmate nearing release, access to employment searching apps or the like. Hence, such inmate tablet computing devices may be used to help soon to be released inmates transition. For example, the tablet may be used to communicate with a future employer, or the like. As such, tablets may be sponsored, or otherwise subsidized by organizations or companies, assisting with the transition of inmates into society.

FIG. 2 is a flowchart of example process implementation 200 for providing digital media files to resident media devices in controlled-environment facilities, according to some embodiments. Example process implementation 200 for providing content, such as podcasts, to residents of a controlled-environment facility includes downloading content at 210, and caching content at 220, by a controlled-environment facility local content server (110) and/or a remote controlled-environment content server (such as datacenter 125 acting as a remote content server). At 230 the content is streamed and/or downloaded within the controlled-environment facility from the controlled-environment facility local or remote content server to a controlled-environment facility resident media device (140) disposed within a portion (160) of the controlled-environment facility (105).

As noted, these controlled-environment facility resident media devices may be tablet computing devices adapted and/or approved for use by residents of the controlled-environment facility and the controlled-environment facility local content server may be firewalled. Streaming and/or downloading may be carried out, at least in part, via Wi-Fi, employing wireless access points (150). As also noted, such streaming and/or downloading may be compartmentalized, leveraging the structure of the controlled-environment facility to limit the availability of a Wi-Fi signal providing the stream, through the placement of wireless access points, antenna directionality of such wireless access points, signal strength, and/or the like. Hence, each wireless access point may be disposed within a physical portion (160) of the controlled-environment facility (105) to provide access by controlled-environment facility resident media devices (140) disposed in that portion of the controlled-environment facility to the streamed and/or downloaded content. For example, the controlled-environment facility may be a correctional facility and the portion of the correctional facility to which streaming is restricted by a particular wireless access point may be a particular cellblock, pod or common area, such as laundry room, the yard (outside), dayroom, cafeteria, exercise facilities, or the like.

Prior to streaming and/or downloading, the controlled-environment facility local content server (110) may determine whether the resident is allowed access to the resident selected content and streaming and/or downloading of the resident selected content is (only) carried out in response to a determination that the resident is allowed access to the resident selected content. In accordance with various embodiments of the present systems and methods, this determination as to whether the resident is allowed access to selected content further comprises accessing a controlled-environment administrative system (130) by the controlled-environment facility local content server. In such embodiments the controlled-environment facility administrative system may allow access to only specific content for the resident as a means to control access (as opposed to trying to maintain a list of disallowed content).

FIG. 3 is a flowchart of example process implementation 300 for providing digital media files to resident media devices in controlled-environment facilities, according to some embodiments. In accordance with embodiments of the present systems and methods for providing media to residents of a controlled-environment facility a resident request for a media file may be transmitted to a content provider at 310. For example, a controlled-environment facility resident may request media from an online store or the like, subscribe to the media, or subscribe to a service that provides the media, such as by using a controlled-environment facility resident tablet computing device (140) and/or as a part of acquiring resident tablet computing device, as discussed in greater detail below. The request may be sent via a wireless network or via a hardware link, to a (wireless) access point (150) the (wireless) access point may then send the request via local network connectivity such as an Ethernet switch (145) to a local content server (110). Subject media may be downloaded by the controlled-environment facility local or remote content server at 320 and at 330 cached by the local content server, which may be firewalled. At 340, the controlled-environment facility local content server may determine whether the resident is allowed access to the media (before or after downloading and caching the media). As noted, this determination whether the resident is allowed access to the media may include accessing a controlled-environment administrative system (130) by the controlled-environment facility local or remote content server. In response to a determination by the controlled-environment facility local or remote content server that the resident is allowed access to the media, the media may be streamed and/or downloaded at 350, within a portion of the controlled-environment facility. This streaming and/or downloading may take place from the controlled-environment facility local or remote content server to a controlled-environment facility resident media device (140) adapted and/or approved for use by residents of the controlled-environment facility (105) and disposed within the portion (160) of the controlled-environment facility. Hence, this streaming and/or downloading may be carried out, at least in part, via Wi-Fi, employing a wireless access point (150) disposed within the portion of the controlled-environment facility to provide access by the controlled-environment facility resident media device disposed within that portion of the controlled-environment facility. For example, the controlled-environment facility may be a correctional facility and the portion of the correctional facility where the wireless access point and the resident media device are disposed may be a cellblock, pod, or a common area, such as a laundry room, the yard (outside), a dayroom, a cafeteria, exercise facilities, or the like. As a result, such streaming and/or downloading may be compartmentalized, leveraging the structure of the controlled-environment facility for example limiting the availability of a Wi-Fi signal providing the stream through the placement of wireless access points, antenna directionality of such wireless access points, signal strength, and/or the like, as discussed in greater detail above.

FIG. 4 is a flowchart of example process implementation 400 for providing digital media files to resident media devices in controlled-environment facilities using multilayered security, according to some embodiments. Method 400 includes receiving a request from a controlled environment facility resident for a digital media file at 410. This request is received by a media device such as the above-described tablet computing devices adapted and/or approved for use by residents of the controlled-environment facility. At 420, the media device determines whether the resident is allowed access to the digital media file before transmitting the request for the media file to a content server at 430, in a manner such as described above. The digital media file is downloaded and cached by the controlled-environment facility content server, which may be local to, or remote with respect to, the controlled-environment facility, at 440. At 450, the controlled-environment facility content server may determine whether the resident is allowed access to the digital media file. In response to a determination by the controlled-environment facility content server that the resident is allowed access to the digital media file, it may be streamed and/or downloaded, within a portion of the controlled-environment facility, from the controlled-environment facility content server, at 460, to the media device, which is located within that portion of the controlled-environment facility. Access to the digital media file is allowed by the digital media device at 480, upon application of security measures with respect to the digital media file by the digital media device at 470. Such security measures implemented by the digital media device's specially adapted operating system may include any one or more of DNS spoofing detection, DNS redirection, use of proxy servers for privacy and security; various types of validation (including biometric, password, and/or the like), reboot elimination, and/or the like.

As noted above, content or media, such as podcasts or the like, may be provided to a resident as a part of a subscription. For example, the resident may prepay, or pay a flat monthly fee, from a trust account, discretionary non-trust account (DINTA), communication account, commissary account, and/or the like maintained by the controlled-environment facility, or a third party, to the benefit the resident, for access to a number of services over the resident tablet, or other media device. In accordance with certain embodiments of the present systems and methods, particularly in a correctional facility environment, a tablet may be provided to an inmate, more-or-less free of charge or at a reduced cost, by an entity such as a facility services provider. Such embodiments may be practical if it seems the inmate will make use of the tablet for sometime, and the inmate would seem to be able to pre-pay for services related to the tablet, such as communications services, Internet access, music subscription services, legal research services, employment search services, and/or the like. For example, the inmate may prepay or pay a flat monthly fee, from the resident's trust account, DINTA, communication account, commissary account, and/or the like, for access to a number of services over the tablet, and the tablet may be provided free of charge or at a discounted rate. Additionally or alternatively, advertisements may appear on the tablet when in use, such as when in use for communications and/or during or before uses of other apps, such as to help defray costs of the tablet (and/or services).

Thus, in accordance with embodiments of the present systems and methods, a resident may be afforded an opportunity to use a controlled-environment facility approved or adapted tablet computing device to access their choice of services, based upon payment and/or the residents ability to access such services. For example, the resident tablet computing device may be able to employ higher speeds of connectivity for a fee. As another example the resident device may be able to access the control environment facility network either only in the resident's living area, or throughout the facility, again based on a price paid and/or security restrictions placed on the resident. Another example of a service that may be provided for a fee includes varying levels of helpdesk services. For example, helpdesk services may be available via email, chat, phone, etc., for an "á la cart" fee and/or based upon a subscription fee paid. As noted above, content that a user is allowed to download or stream in accordance with the present systems and methods may be limited based upon security concerns. Additionally or alternatively, the content a resident is allowed to download and/or stream may further be limited based upon the subscription and/or one time fees paid by the resident. Moreover, web destinations or the like may be limited based upon fees paid and/or similar security limitations. For example, while access to a basic search engine may be allowed for almost all devices, access to premium services such as music sites, video sites, or the like may be restricted, again based upon payment or security concerns.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
   transmitting a controlled-environment facility resident request for an electronic media file to a content provider;
   downloading and caching the electronic media file by a controlled-environment facility content server from a content provider in response to the request;
   determining whether the resident is allowed access to content of the electronic media file; and
   streaming and/or downloading, only within a predefined portion of the controlled-environment facility, the electronic media file from the controlled-environment facility content server to a controlled-environment facility resident media device disposed within that portion of the controlled-environment facility, in response to a determination that the resident is allowed access to content of the electronic media file, the predefined portion of the controlled-environment facility compartmentalized by structure of the controlled-environment facility limiting wireless local area networking connectivity from a wireless access point disposed in the predefined portion of the controlled-environment facility to only provide access by controlled-environment facility resident media devices disposed in that predefined portion of the controlled-environment facility.

2. The method of claim 1, wherein the controlled-environment facility server is located local to the controlled-environment facility.

3. The method of claim 1, wherein the controlled-environment facility server is located remote with respect to the controlled-environment facility.

4. The method of claim 1, wherein the controlled-environment facility is a correctional facility and the portion of the correctional facility is a cellblock, pod, common area, outdoor yard, cafeteria, or exercise facility.

5. The method of claim 1, wherein determining whether the resident is allowed access to the content of the electronic media file is carried out by the controlled-environment facility content server and the streaming and/or downloading is carried out in response to a determination by the controlled-environment facility content server that the resident is allowed access to the content of the electronic media file.

6. The method of claim 5, wherein determining whether the resident is allowed access to the content of the electronic media file further comprises accessing a controlled-environment administration system by the controlled-environment facility content server.

7. The method of claim 1, wherein the controlled-environment facility resident media devices are tablet computing devices adapted and/or approved for use by residents of the controlled-environment facility.

8. The method of claim 1, wherein the content comprises at least one of a podcast, streaming music, employment site content, job search results, training content, law library content, game, communications, e-books, movies, streaming television content, and job search results.

9. The method of claim 1, wherein signal strength of the wireless local area networking signals further compartmentalizes wireless local area networking connectivity from the wireless access point disposed in a predefined portion of the controlled-environment facility to provide access by controlled-environment facility resident media devices disposed only in that portion of the controlled-environment facility.

10. A controlled-environment facility digital media distribution system comprising:
    a controlled-environment facility content server, comprising storage caching content from content providers, and configured to determine whether a controlled-environment facility resident is allowed access to content requested by the resident and to stream and/or download the content requested by the resident in response to a determination that the resident is allowed access to the content;
    a network connection linking the controlled-environment facility content server to at least one content provider, the content requested by the resident requested by the controlled-environment facility content server from the at least one content provider and downloaded over the network connection; and
    connectivity from the controlled-environment facility content server to controlled-environment facility resident media devices within the controlled-environment facility including wireless local area network connectivity from a wireless access point disposed in a predefined portion of the controlled-environment facility and structure of the controlled-environment facility and directionality of wireless local area networking signals compartmentalizes wireless local area networking connectivity from the wireless access point to only provide access by controlled-environment facility resident media devices disposed in that predefined portion of the controlled-environment facility.

11. The system of claim 10, wherein the controlled-environment facility server is located local to the controlled-environment facility.

12. The system of claim 10, wherein the controlled-environment facility server is located remote with respect to the controlled-environment facility.

13. The system of claim 10, wherein the content comprises at least one of a podcast, streaming music, employment site content, job search results, training content, law library content, game, communications, e-books, movies, streaming television content, and job search results.

14. The system of claim 10, wherein signal strength of the wireless local area networking signals further compartmentalizes wireless local area networking connectivity from the wireless access point disposed in a predefined portion of the controlled-environment facility to provide access by controlled-environment facility resident media devices disposed only in that portion of the controlled-environment facility.

15. The system of claim 10, wherein the controlled-environment facility is a correctional facility and the portion of the correctional facility is a cellblock, pod, common area, outdoor yard, cafeteria, or exercise facility.

16. The system of claim 10, wherein the controlled-environment facility resident media devices are tablet computing devices adapted and/or approved for use by residents of the controlled-environment facility.

17. The system of claim 10, wherein the controlled-environment facility content server comprises a firewall.

18. The system of claim 10, wherein the controlled-environment facility content server streams and/or downloads the content to the resident media device in response to the determination that the resident is allowed access to the content.

19. The system of claim 10, wherein the controlled-environment facility content server accesses a controlled-environment facility administration system to determine whether the resident is allowed access to the content.

20. A method comprising:
transmitting by a controlled-environment facility content server a controlled-environment facility resident request to a content provider for a digital media file;
downloading and caching the digital media file by the controlled-environment facility content server as a result of the request;
determining by the controlled-environment facility content server whether the resident is allowed access to content of the digital media file;
streaming and/or downloading the digital media file within only a predefined portion of the controlled-environment facility, in response to a determination by the controlled-environment facility content server that the resident is allowed access to content of the digital media file, from the controlled-environment facility content server to a controlled-environment facility resident media device adapted and/or approved for use by residents of the controlled-environment facility and disposed within that portion of the controlled-environment facility, the predefined portion of the controlled-environment facility compartmentalized by structure of the controlled-environment facility limiting wireless local area networking connectivity from a wireless access point disposed in the predefined portion of the controlled-environment facility to only provide access by controlled-environment facility resident media devices disposed in that predefined portion of the controlled-environment facility.

21. The method of claim 20, wherein the controlled-environment facility server is located local to the controlled-environment facility.

22. The method of claim 20, wherein the controlled-environment facility server is located remote with respect to the controlled-environment facility.

23. The method of claim 20, wherein the controlled-environment facility is a correctional facility and the portion of the correctional facility is a cellblock, common area, outdoor yard, cafeteria, or exercise facility.

24. The method of claim 20, wherein determining whether the resident is allowed access to content of the digital media file further comprises accessing a controlled-environment facility administration system by the controlled-environment facility content server.

25. The method of claim 20, wherein signal strength of the wireless local area networking signals further compartmentalizes wireless local area networking connectivity from the wireless access point disposed in a predefined portion of the controlled-environment facility to provide access by controlled-environment facility resident media devices disposed only in that portion of the controlled-environment facility.

26. A method comprising:
receiving by a media device adapted and/or approved for use by residents of a controlled-environment facility a request from a controlled environment facility resident for a digital media file;
determining by the media device whether the resident is allowed access to content of the digital media file;
transmitting by a controlled-environment facility content server the resident request for the digital media file to a content provider;
downloading and caching the digital media file by the controlled-environment facility content server as a result of the request;
determining by the controlled-environment facility content server whether the resident is allowed access to content of the digital media file;
streaming and/or downloading the digital media file, only within a predefined portion of the controlled-environment facility, in response to a determination by the controlled-environment facility content server that the resident is allowed access to content of the digital media file, from the controlled-environment facility content server to the media device within the portion of the controlled-environment facility, the predefined portion of the controlled-environment facility compartmentalized by structure of the controlled-environment facility limiting wireless local area networking connectivity from a wireless access point disposed in the predefined portion of the controlled-environment facility to only provide access by controlled-environment facility resident media devices disposed in that predefined portion of the controlled-environment facility; and
allowing access to the digital media file by the media device upon application of security measures with respect to the digital media file by the media device.

27. The method of claim 26, wherein security measures with respect to the digital media file applied by the media device comprise DNS spoofing detection, DNS redirection, use of proxy servers for privacy and security; biometric validation, password validation and reboot elimination.

28. The method of claim 26, wherein signal strength of the wireless local area networking signals further compartmentalizes wireless local area networking connectivity from the wireless access point disposed in a predefined portion of the controlled-environment facility to provide access by controlled-environment facility resident media devices disposed only in that portion of the controlled-environment facility.

* * * * *